(12) United States Patent
Heselhaus et al.

(10) Patent No.: US 6,270,143 B1
(45) Date of Patent: Aug. 7, 2001

(54) FOLDING ROOF FOR A CONVERTIBLE

(75) Inventors: Udo Heselhaus, Ibbenbueren (DE); Wolfgang Richter, Commerce, MI (US)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/696,938

(22) Filed: Oct. 26, 2000

(30) Foreign Application Priority Data

Nov. 18, 1999 (DE) ................................. 199 55 404

(51) Int. Cl.[7] ..................................................... B60J 10/10
(52) U.S. Cl. ............... 296/107.01; 116/122; 116/107.09; 116/107.07
(58) Field of Search ...................... 296/107.01, 107.09, 296/122, 116, 108, 107.08

(56) References Cited

U.S. PATENT DOCUMENTS

| 4,828,317 | * | 5/1989 | Muscat .................................. 296/116 |
| 5,031,957 | * | 7/1991 | Claar et al. ............................ 296/108 |
| 5,207,474 | * | 5/1993 | Licher et al. ........................... 296/116 |
| 5,620,226 | * | 4/1997 | Sautter .............................. 296/107.01 |
| 5,816,644 | * | 10/1998 | Rothe et al. ....................... 296/107.01 |
| 5,971,470 | * | 10/1999 | May et al. ........................ 296/107.09 |
| 5,998,948 | * | 12/1999 | Lange et al. ........................... 296/122 |
| 6,010,178 | * | 1/2000 | Hahn et al. ....................... 296/107.08 |
| 6,039,382 | * | 3/2000 | Marther et al. .................. 296/107.01 |
| 6,039,383 | * | 3/2000 | Jambor et al. .................... 296/107.07 |
| 6,048,021 | * | 4/2000 | Sautter ............................. 296/107.09 |
| 6,139,087 | * | 10/2000 | Wolfmaier et al. .................. 296/122 |
| 6,199,936 | * | 3/2001 | MacFarland .......................... 296/116 |

FOREIGN PATENT DOCUMENTS

| 000530770 | * | 9/1956 | (CA) | ............................... 296/107.09 |
| 001351390 | * | 12/1963 | (FR) | ............................... 296/107.09 |
| 000388324 | * | 2/1933 | (GB) | ............................... 296/107.09 |
| 000518801 | * | 3/1940 | (GB) | ............................... 296/107.09 |

* cited by examiner

*Primary Examiner*—Joseph D. Pape
*Assistant Examiner*—Kiran B. Patel
(74) *Attorney, Agent, or Firm*—Jordan and Hamburg LLP

(57) ABSTRACT

A folding top for a convertible has a lateral folding linkage with linkage legs lying opposite to one another in pairs, symmetrically to the longitudinal center plane of the vehicle. The parallelogram links of the linkage legs form a front and a rear four-bar chain, which is supported in the region of a common connecting leg with at least three hinge points. In the case of the inventive folding top, the connector between the two four-bar chains is constructed as a cantilever girder supporting a rear guiding leg of the front four-bar chain as well as a front main guide bar of the rear four-bar chain with a height distance in in each case one of its hinge points and the front four-bar chain with the front link forming the third hinge point is assigned to this cantilever girder.

13 Claims, 7 Drawing Sheets

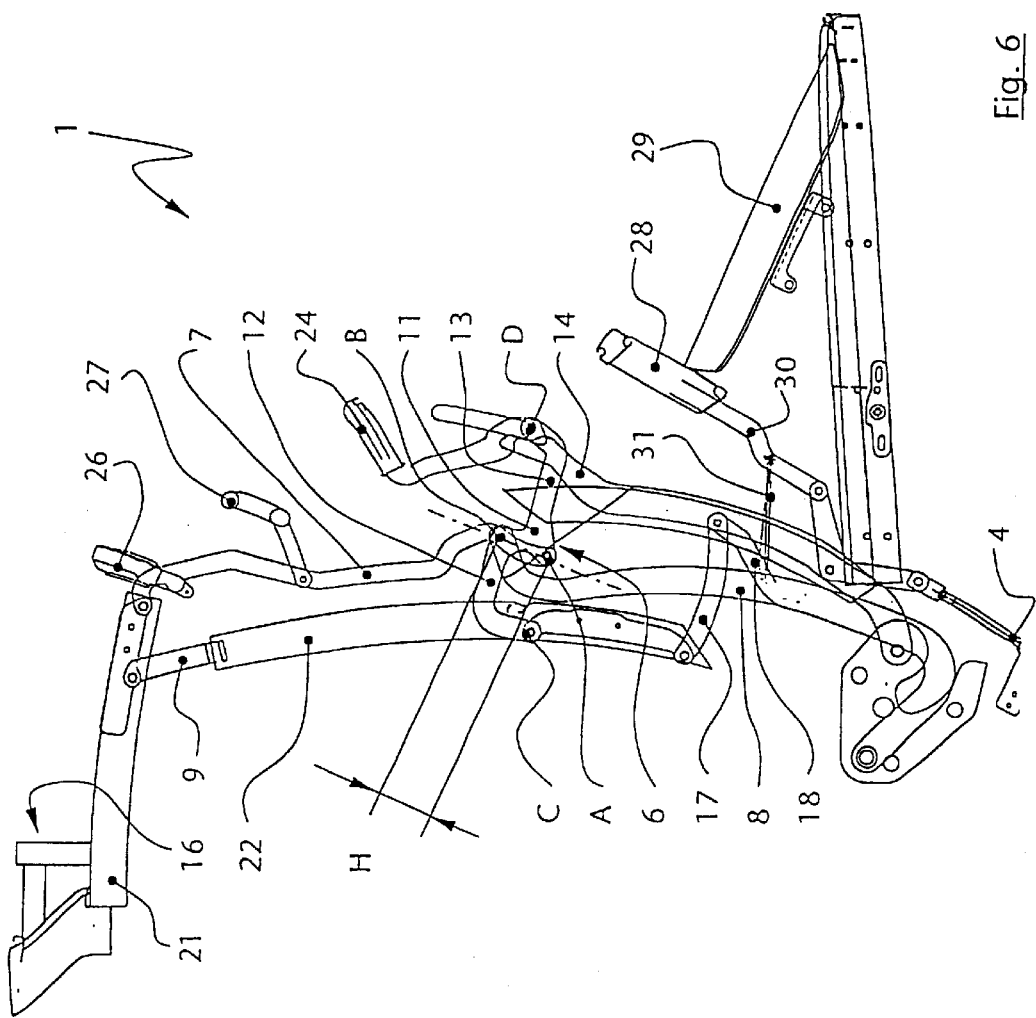

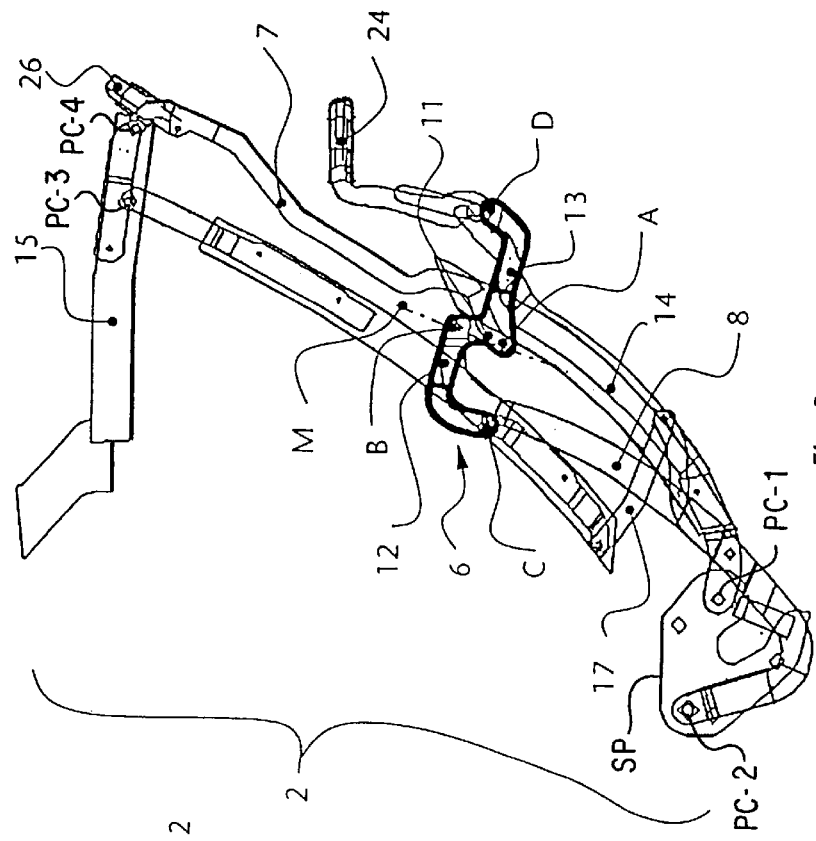
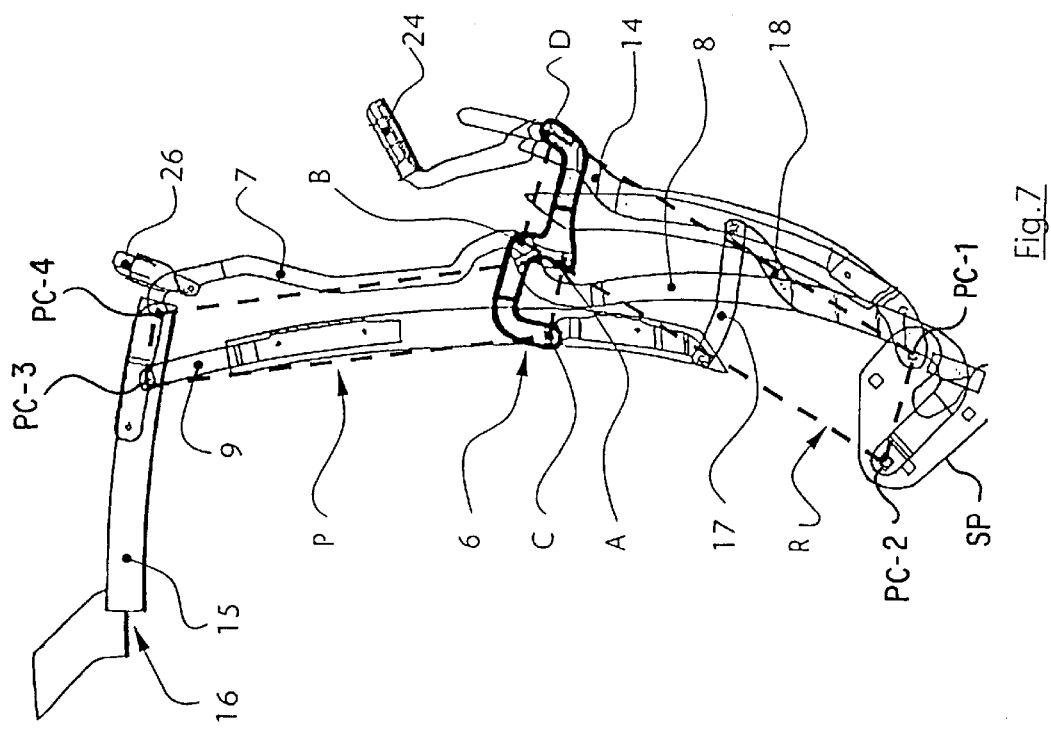
Fig. 8
Fig. 7

FOLDING ROOF FOR A CONVERTIBLE

BACKGROUND OF THE INVENTION

The invention relates to a folding top for a convertible.

The invention is concerned with the problem of developing further a convertible vehicle with a folding top of the type known from EP 0 521 307 B1 in such a manner, that the kinematics of the folding top can be adapted with little effort to the respective roof contours and length dimensions of different vehicle bodies and that the linkages of the folding top, in a multi-element construction, can be transferred so that, during the material-protective setting motion into the opening position, the roof peak part has the protective cover position.

SUMMARY OF THE INVENTION

In the region of its two four-link chains integrated as a parallelogram link into the folding linkage, the inventive folding top is provided with a cantilever girder, which acts between these as a central control unit and specifies the distances from in each case two hinge points, optimum for two four-bar chains. This spatial assignment of the hinge points at the cantilever girder can be constructed structurally variably, so that a roof skin contour, adaptable to the vehicle dimensions of different car bodies, can be accommodated with the folding top kinematics and appropriate setting and closing movements are possible with the folding linkage.

The cantilever girder, provided as a control unit, comprises the four linkage legs of the four-bar chains disposed behind one another, the hinge points of at least one leg of each hinge chain being disposed in a central crossing region with a height distance at the cantilever girder and, at the latter, a steering cross, controlling the course of motion, being defined. With this, at least one leg part of the front four-bar chain can be relocated during the introduction of the swiveling movement of the folding top with a swiveling/pushing component. During the opening movement, at least one partial section of the folding top frame carrying the roof skin and supported at the leg of the four-bar is relocated in such a manner, that this part passes through its own curve of motion and, upon reaching the opening position above a rear frame part, is stowed. At the same time, the front roof peak part is guided with a simple swiveling motion out of its position at the windshield frame corresponding to the closed contour of the folding top into the rear protective cover position in such a manner, that the rear parts of the folding linkage, folded into the stowage position, are covered at least regionally.

During the setting motion, the parts of the folding linkage are controlled by means of the cantilever girder in such a manner, that the roof skin experiences optimum folding and, with that, excessive stressing due to compressive and/or tensile stresses in the region of the roof skin, which would lead to material breakage, are avoided.

Further details and advantageous effects of the invention arise out of the following description and the drawing, in which an example of the invention is illustrated in greater detail.

BRIEF DESCRIPTION OF THE DRAWINGS

FIG. 6 shows a diagrammatic representation of the folding linkage in an opening phase, similar to that of FIG. 3; and FIGS. 7 and 8 show the respective movement phases of folding linkage, illustrated in its individual parts (similar to FIGS. 3 and 4).

DESCRIPTION OF THE PREFERRED EMBODIMENT

Figure 1:
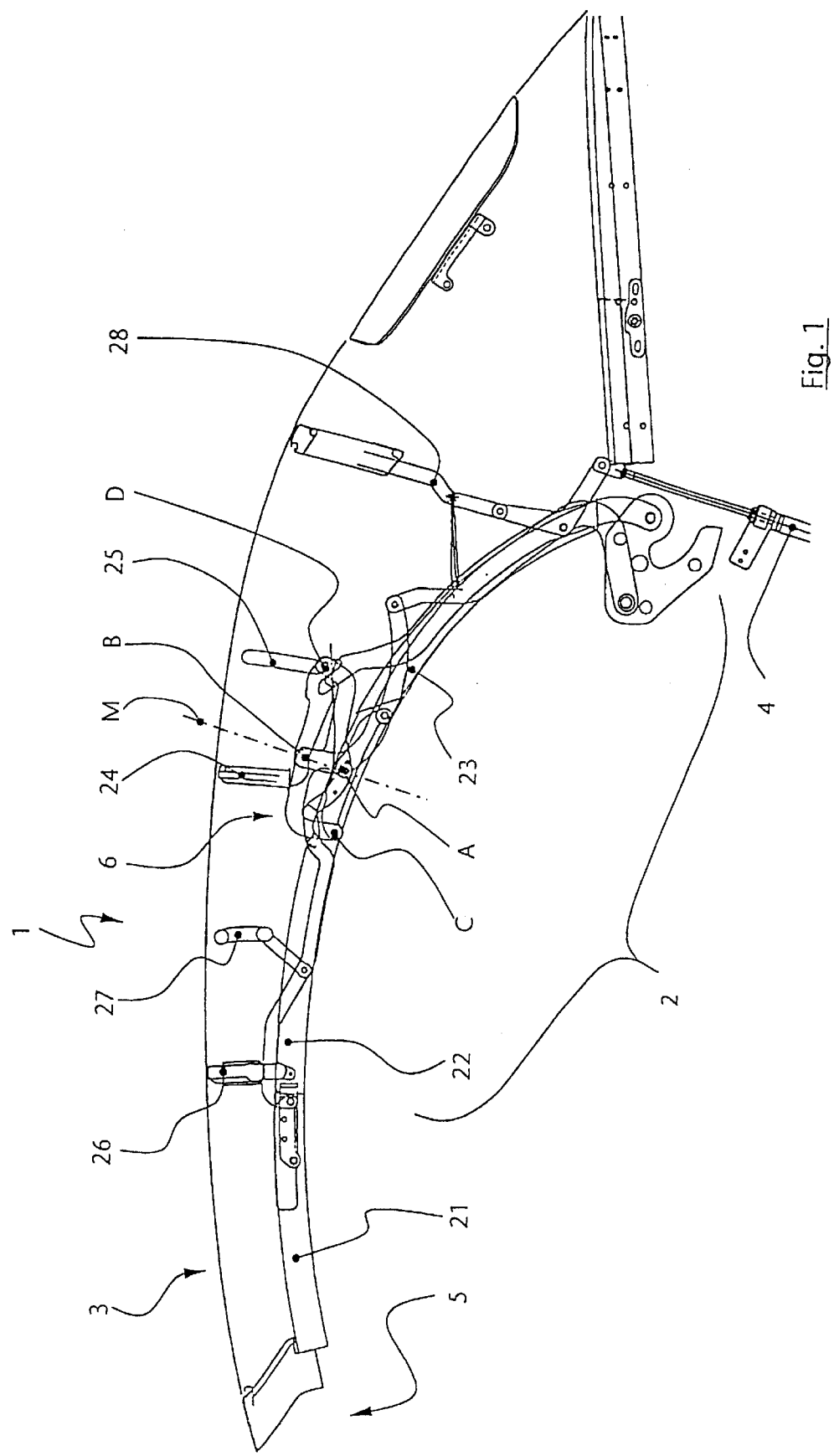
FIG. 1 shows a sectional representation of a convertible with a folding top in the closed position at the front windshield frame.

The folding top, labeled 1 as a whole in FIG. 1, of a convertible, the details of which are not shown other than the structure part SP, and the roof skin 3 of which, engaging a lateral folding linkage 2 (of which in each case only one'side is shown in all the representations), is accommodated between linkage legs lying opposite to one another symmetrically to the longitudinal center plane of the vehicle. The linkage legs form a front (P) and a rear (R) four-bar chain in the form of respective parallelogram links P and R (shown by broken lines in FIG. 7). In the region of a connecting leg disclosed in the EP 0 521 307 B1, these four-bar chains are supported jointly so that at least three hinge points are formed and, when a setting motion is initiated by means of a hydraulic cylinder 4 (arrow S, FIG. 2), the folding top 1 can be relocated by a controlled swiveling process from the closed position (FIG. 1) held in the front window region 5 towards the rear region of the vehicle into a protective cover position (FIG. 5) and returned from the latter.

The inventive construction of the folding top 1 has a connector, which is formed between the two four-bar chains P and R as a cantilever girder 6 (FIG. 7) and at which a rear guiding leg 7 of the front four-bar chain P as well as a front main guiding rod 8 of the rear four-bar chain R are supported in each case at one hinge point A or B with a height distance H. At the same time, the front four-bar chain with the front link 9 forming the third hinge point C is assigned to the cantilever girder 6. During the opening motion of the folding top initiated by the setting motion S (arrow F, FIG. 3), the front link 9 is swiveled in the same direction F' and, at the same time, shifted in the direction T (FIG. 3), so that, due to this swiveling/pushing component (arrow F', T in FIG. 3), the front link 9 passes through its own path curve.

The cantilever girder 6 is constructed as a controlling intermediate part of the parallelogram link arrangement in such a manner that, between the two hinge points A and B, having the height distance H, a generally upright axis M is defined (FIG. 3), which has a constant angular position in each position of the folding roof (FIGS. 1 to 5). In the embodiment shown, the height distance H of the two hinge points A and B is also constant in each position of the folding roof 1.

Figure 2:
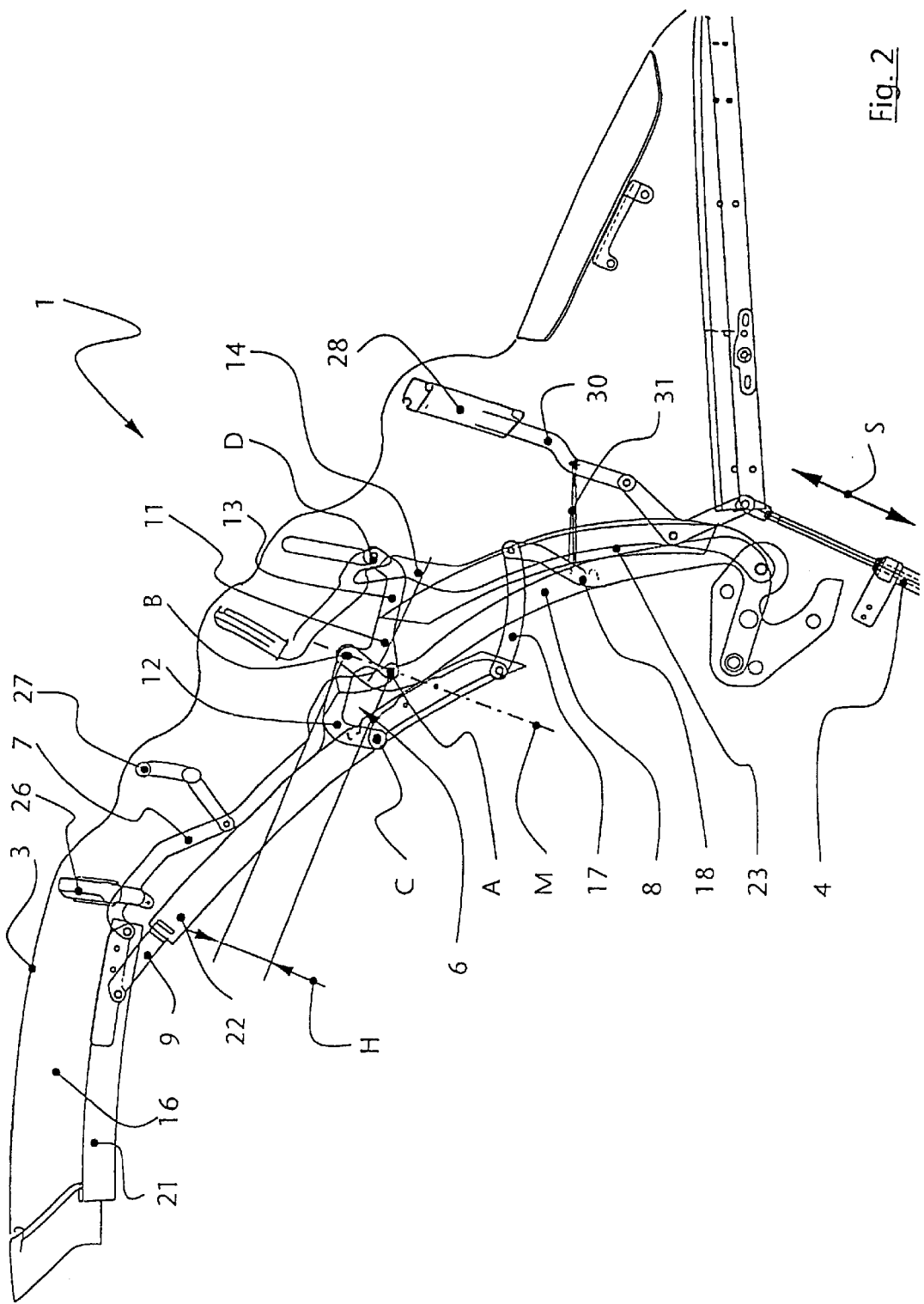
FIGS. 2 to 4 show the respective movement phases when the setting motion at the folding top of FIG. 1 is initiated.
Figure 3:
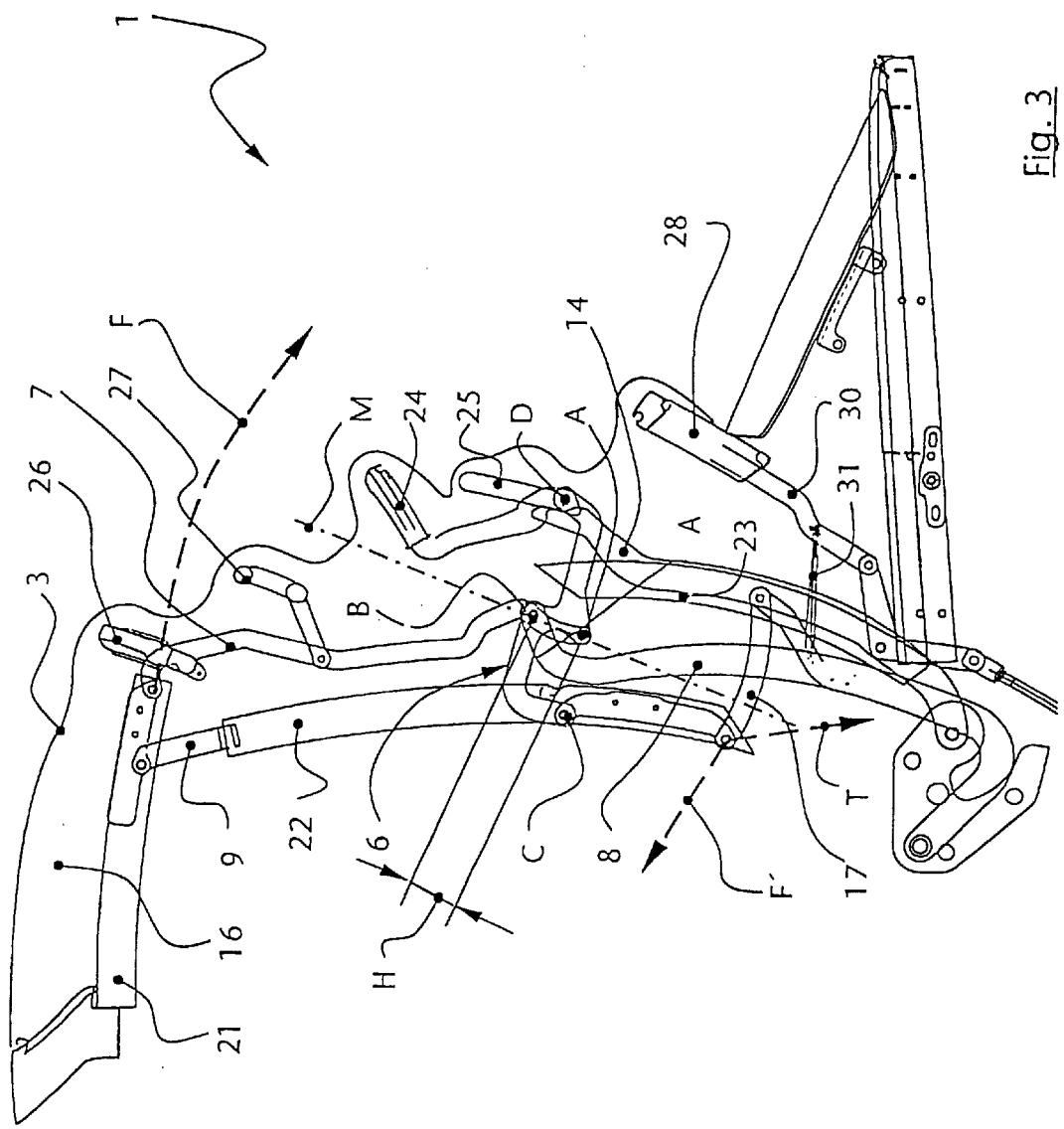
Figure 4:
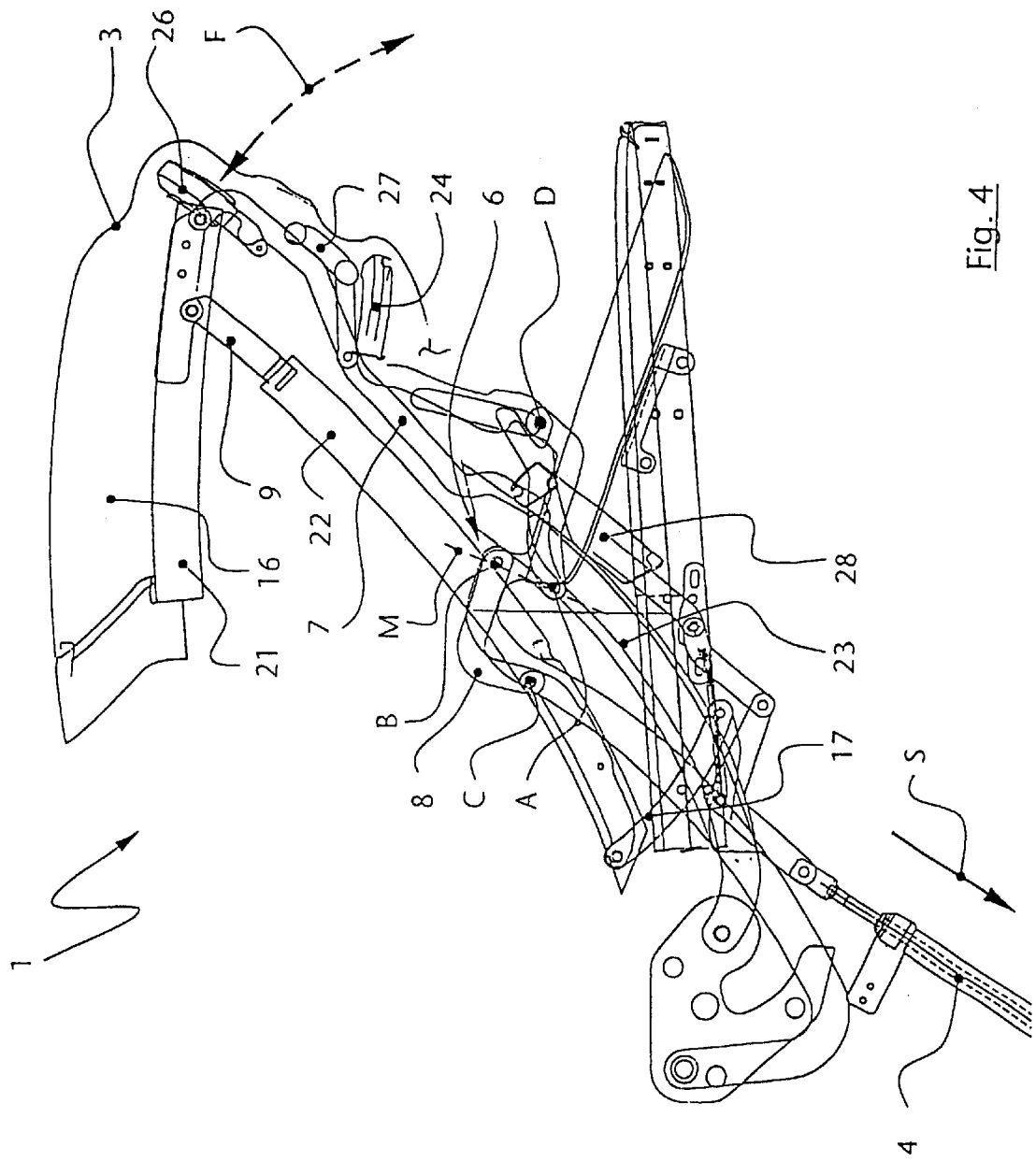

The detailed representations of the parts of the folding linkage 2 of FIGS. 7 and 8, when viewed together with the movement phases of FIGS. 2 and 3, illustrate the action of the cantilever girder 6 as a steering cross, the hinge point B of the front main guide bar 8 of the rear four-bar R being disposed with the height distance H above the hinge point A of the rear guide bar 7 of the front four-bar chain P.

In the embodiment shown, the cantilever 6, the dimensions of which may vary widely, is constructed as a one-part, essentially z-shaped component, at the middle part 11 of which, which in the installed position extends, essentially perpendicularly, the two middle hinge points A and B having the height distance H, as well as the respective supporting arms 12, 13 are provided with the hinge points C and D supporting the front links 9 of the front four-bar chain P and the rear links 14 of the rear four-bar chain R. FIGS. 7 and 8 show that the rear link 14 along with the front main guiding rod 8 are pivotably connected to the structure part SP at PC-1 and PC-2 respectively.

The detailed representations of the folding linkage 2 of FIGS. 7 and 8 show that the front supporting arm 12 of the cantilever girder 6, directed towards the front four-bar chain P, is hinged in the central region of the front link 9. On the one hand, this front link 9 pivotably engages the side leg 15 of the roof peak part 16 at PC-3 and of the folding linkage 2 and on the other, the front link 9 is connected over a rocker arm 17 with a supporting lever 18 of the main guide bar 8 of the rear four-bar chain R. FIGS. 7 and 8 also show that the rear guiding leg 7 pivotably engages the side leg 15 of the roof peak part 15 at PC-4.

Figure 5:
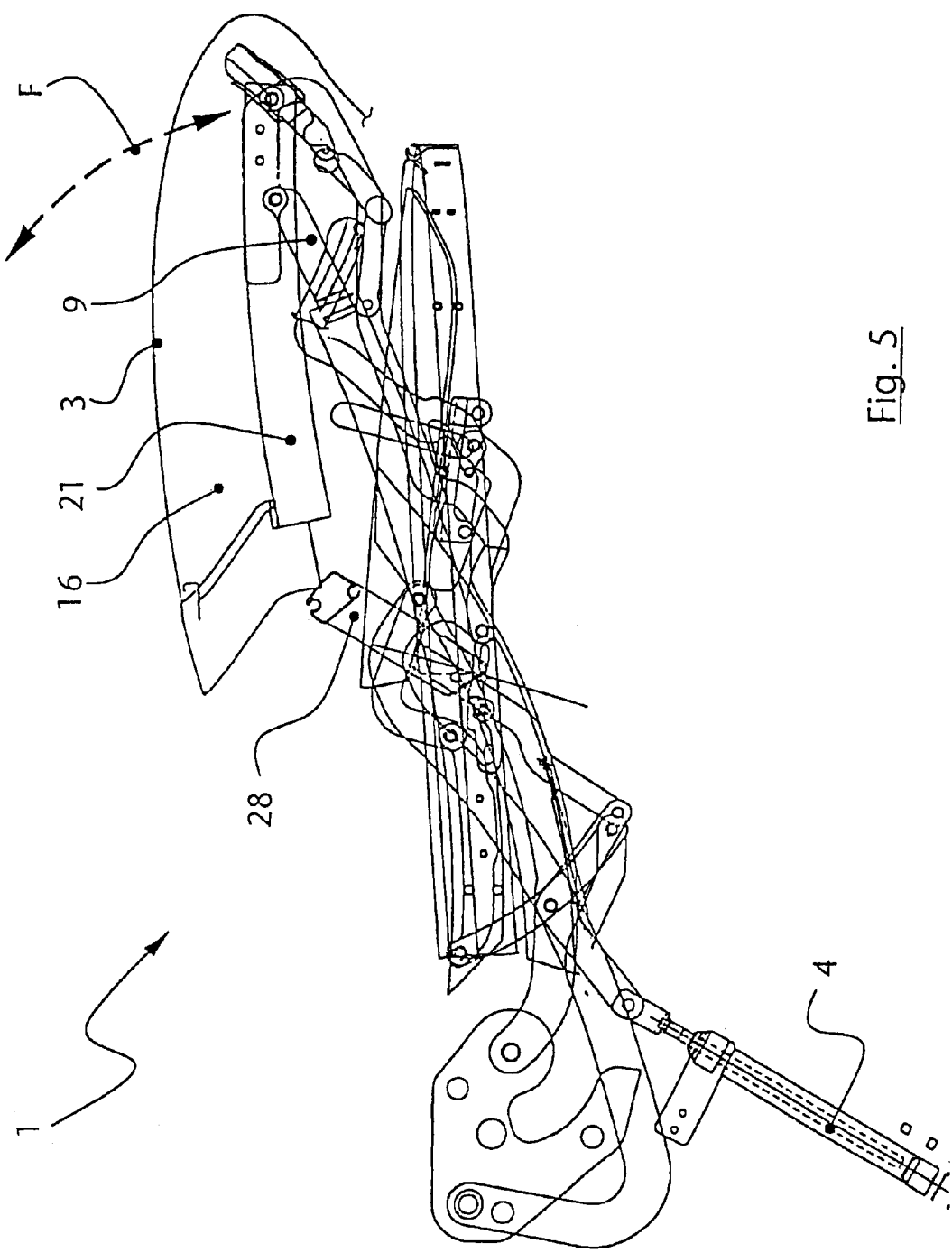
FIG. 5 shows the folding top of FIG. 1 with the roof peak part swiveled into the protective covered position.

With the above described construction of the folding linkage 2 and the connection of the lever construction to the cantilever girder 6, it is achieved that the two four bar chains P and R can control the roof frame, having in particular three partial sections 21, 22, 23 and connecting the roof skin 3 with the folding linkage 2 at least in the central partial section 22, in such a manner that a material-protecting relocation of the roof skin 3 into the opening position (FIG. 5) is possible and, at the same time, the front link 9 with its central partial section 22 can be positioned into a lowering position next to the rear partial section 23. With that, an advantageous tight packing position is achieved and the roof peak part 16, which is swiveled back, overlaps the parts of the folding top folded in the opening position (FIG. 5).

The gentle movement of the skin 3 of the roof becomes clear particularly owing to the fact that the cantilever girder 6, in the region of its rear supporting arm 13, forms the fourth hinge point D which, in addition to the rear link 14 of the rear four-bar chain R, also supports two further folding top tensioning bows 24, 25 undergrasping the roof skin 3.

In the embodiment shown of FIGS. 1 to 5, two further roofs bows 26 and 27 are provided in the front region of the folding linkage 2 and a main tensioning bow 28 is provided in the rear region of the folding top 1. This main tensioning bow 28 brings about a stable tensioning of the roof skin (FIG. 1), particularly above a rear window 29 (FIG. 6). The main tensioning bow 28 is connected over a rocker arm 30 with the rear link 14 and secured additionally over a spring damper 31.

What we claim is:

1. A convertible apparatus for unfolding and folding a roof material on a frame structure between unfolded and folded positions, comprising a front parallelogramatic linkage (P) adapted to be attached to a front windshield structure and at least partially supporting the roof material, a rear parallelogramatic linkage (R) at least partially supported on said frame structure, said front and rear parallelogramatic linkages (P,R) having a common connecting member (6) having at least first, second and third pivot connections (A,B,C) said first and second pivot connection (A,B) being elevationally spaced from one another, said front parallelogramatic linkage (P) including first and second link members (7,9) pivotably connected to said connecting member (6) at said first and third pivot connections (A,C) respectively, said second link member (9) extending beyond said third pivot connection, said rear parallelogramatic linkage (R) including a third link member (8) pivotably connected to said connecting member (6) at said second pivot connection (B), said apparatus being movable from the unfolded position toward the folded position as said front parallelogramatic linkage (P) pivots about said first and third pivot connections (A,C) in a pivotal direction (F) to thereby effect elevation of said second link member (9) relative to said third pivot connection (C) while said second link member (9) and said third pivot connection (C) are generally lowered relative to said frame structure.

2. A convertible apparatus according to claim 1 wherein said convertible apparatus passes through a plurality of intermediate positions while being moved between said unfolded and folded positions, said first and second pivots connections (A,B) being elevationally spaced from one another at a substantially constant distance (H) for all positions of the convertible apparatus.

3. A convertible apparatus according to claim 1 wherein said convertible apparatus passes through a plurality of intermediate positions while being moved between said unfolded position and folded position, said first and second pivot connections (A,B) passing through a straight line (M) which remains oriented substantially in the same direction for all positions of the convertible apparatus.

4. A convertible apparatus according to claim 3 wherein said straight line (M) is disposed at substantially the same angle relative to horizontal for all positions of the convertible apparatus.

5. A convertible apparatus according to claim 1 wherein said first link member is a first rear link member (7), said third link member is a third link member (8), said pivot connection (A) for said first rear link member (7) being disposed at a lower elevation than said pivot connection (B) for said third front link member (8).

6. A convertible apparatus according to claim 1 wherein said convertible apparatus passes through a plurality of intermediate positions while being moved between said unfolded and folded positions, at least a section of said front parallelogramatic linkage (P) being disposed at a higher elevation than at least a section of said rear parallelogramatic linkage (R) when said convertible apparatus is in said unfolded and folded positions, said first link member (7) being disposed generally rearwardly of said first link member (9) when said convertible apparatus is in one of said intermediate positions, said rear parallelogramatic linkage (R) including a fourth link member (14) pivotably connected to said connecting member (6) at said fourth pivot connection (D), said fourth link member (14) being disposed generally rearwardly of said third member (8) when said convertible apparatus is in said one intermediate position, said pivot connection (A) for said first link member (7) being disposed at a lower elevation than said pivot connection (B) for said third link member (8) when said convertible apparatus is in said unfolded, said one intermediate and said folded positions.

7. A convertible apparatus according to claim 1 wherein said connecting member (6) includes a fourth pivot connection (D), said second parallelogramatic linkage (R) including a fourth link member (14) pivotably connected to said connecting member (6) at said fourth pivot connection (D), said connecting member (6) having a central portion, said first and second pivot connections (A,B) being located on said central portion, said connecting member (6) having two arms (12,13) extending from opposite sides of said central portion, said third pivot connection (C) being located on one arm (12) and said fourth pivot connection (D) being located on the other arm (13).

8. A convertible apparatus according to claim 1 wherein said connecting member (6) has a generally Z-shaped configuration.

9. A convertible apparatus according to claim 1 where said second link member (9) has a main portion, said third pivot connection (C) being disposed at a juncture between said main portion and said extending portion, a roof peak part (15) juxtaposed to the roof material, said roof peak part (15) being pivotably connected to said main portion of said second link member (9), a rocker arm (17) pivotably connected to said extending portion of said second link member (9), and a supporting lever (18) pivotably connecting to said rocker arm (17) and engaging said third link member (8).

10. A convertible apparatus according to claim 1 further comprising a roof frame having at least two roof frame sections (22,23), said roof frame being connected to said first and second parallelogramatic linkages (P,R).

11. A convertible apparatus according to claim 1 wherein the connecting member (6) includes a fourth pivot connection (D) and the rear parallelogramatic linkage (R) includes a fourth link member (14) pivotably connected to said fourth pivot connection (D), a roof peak part (15) pivotably connected to said first and second link members (7,9), a roof frame for the roof material, said roof frame having first, second and third roof sections (21, 22,23), said first roof sections (21) being connected to said roof peak part (15), said second roof section (22) being connected to said second link member (9), and said third roof section engaging said fourth link member (14).

12. A convertible apparatus according to claim 1 wherein the connecting member (6) includes a fourth pivot connection (D) and the rear parallelogramatic linkage (R) includes a fourth link member (14) pivotably connected to said fourth pivot connection (D), and at least one tensioning bow (24, 28) for supporting the roof material, said tensioning bow (24,28) being supported on said fourth link member (14).

13. A convertible apparatus according to claim 1 including at least one tensioning bow (27) for supporting the roof material, said tensioning bow (27) being supported on said first link member (7).

* * * * *